United States Patent
DeLuca et al.

(10) Patent No.: US 10,326,726 B1
(45) Date of Patent: Jun. 18, 2019

(54) ALERT MODIFICATION BASED ON SOCIAL MEDIA ACTIVITY

(71) Applicant: International Business Machines Corporation, Armonk, NY (US)

(72) Inventors: Lisa Seacat DeLuca, Baltimore, MD (US); Jeremy Greenberger, San Jose, CA (US); Zachary Greenberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/828,519

(22) Filed: Dec. 1, 2017

(51) Int. Cl.
- G08B 5/22 (2006.01)
- H04L 12/58 (2006.01)
- H04M 1/725 (2006.01)

(52) U.S. Cl.
CPC .............. *H04L 51/24* (2013.01); *H04L 51/26* (2013.01); *H04L 51/32* (2013.01); *H04M 1/72569* (2013.01); *H04M 1/72597* (2013.01)

(58) Field of Classification Search
CPC . G06F 15/16; G06F 3/14; H04B 1/38; H04M 1/00
USPC ........ 340/7.51–7.58, 501, 540, 7.6; 709/203, 709/206, 217, 219, 223, 224; 455/574, 455/567, 425
See application file for complete search history.

(56) References Cited

U.S. PATENT DOCUMENTS

| | | | | |
|---|---|---|---|---|
| 6,249,668 B1* | 6/2001 | Abe | .................... | H04W 88/023 340/7.2 |
| 6,973,336 B2* | 12/2005 | Heie | .................... | G08B 3/1025 455/414.4 |
| 8,781,105 B1* | 7/2014 | Duva | ................. | G06Q 30/0246 379/201.01 |
| 8,823,507 B1* | 9/2014 | Touloumtzis | ........... | H04L 67/24 340/501 |
| 9,319,473 B2 | 4/2016 | Zadorozny et al. | | |
| 9,349,263 B2* | 5/2016 | Kiefer | ...................... | G08B 6/00 |
| 9,413,838 B1* | 8/2016 | Ovsiankin | ......... | G06F 17/30554 |
| 9,467,970 B1* | 10/2016 | Kim | .................... | H04L 12/1895 |
| 9,563,627 B1* | 2/2017 | Wheeler | ................. | G06F 17/30 |
| 9,564,040 B1* | 2/2017 | Charlton | ........... | G06F 17/30867 |
| 9,892,168 B1* | 2/2018 | Apreleva | ............... | G06N 7/005 |
| 2010/0180001 A1* | 7/2010 | Hardt | ...................... | G06F 11/32 709/207 |
| 2012/0011242 A1* | 1/2012 | Suchter | ............... | G06F 11/3006 709/224 |

(Continued)

OTHER PUBLICATIONS

Parameswaran Thrissur Krishnamoorthy; Ttl: Method and System for Suggesting Activities for a Location Based on a Users Social Network; Jun. 8, 2015; Database: IP.COM; IP.COM No. IPCOM000241907D.

(Continued)

*Primary Examiner* — Nam V Nguyen
(74) *Attorney, Agent, or Firm* — Schmeiser, Olsen & Watts, LLP; Isaac Gooshaw

(57) ABSTRACT

An alert system and method may include receiving a notification message, identifying a content of the notification message, in response to receiving the notification message, analyzing a social media activity of the user to determine that the content of the notification message is relevant to the social media activity of the user, and alerting, by the processor, the user of the notification message in accordance with a modified alert preference.

17 Claims, 15 Drawing Sheets

(56) References Cited

U.S. PATENT DOCUMENTS

| | | | |
|---|---|---|---|
| 2013/0137464 A1* | 5/2013 | Kramer | G06Q 30/02 |
| | | | 455/456.3 |
| 2014/0095617 A1 | 4/2014 | Chan et al. | |
| 2014/0129661 A1* | 5/2014 | Thyagaraja | G06F 9/542 |
| | | | 709/207 |
| 2015/0105060 A1 | 4/2015 | An | |
| 2015/0140982 A1 | 5/2015 | Postrel | |
| 2016/0119771 A1 | 4/2016 | Moldaysky et al. | |
| 2016/0343009 A1 | 11/2016 | Ovsiankin et al. | |

OTHER PUBLICATIONS

U.S. Appl. No. 15/708,334, filed Sep. 19, 2017.

* cited by examiner

ALERT MODIFICATION BASED ON SOCIAL MEDIA ACTIVITY

TECHNICAL FIELD

The present invention relates to systems and methods for alert modification, and more specifically the embodiments of an alert system for alerting a user based on a relevancy to a social media activity of the user and a content of a notification.

BACKGROUND

Notification sources, such as bluetooth low energy (BLE) beacons provide an enhanced experience for customers of venues, such as stadiums, airports, retail stores, shopping malls, and hospitals. The beacons can be used for a wide range of uses, from sales promotions to building security. Likewise, notifications for software applications are also received.

SUMMARY

An embodiment of the present invention relates to a method, and associated computer system and computer program product, for modifying an alert based on a relevancy to a social media activity of the user and a content of a notification. A processor of a computing system receives a notification message. A content of the notification message is identified in response to receiving the notification message. A social media activity of the user is analyzed to determine that the content of the notification message is relevant to the social media activity of the user. The user is alerted to the notification message in accordance with a modified alert preference.

DETAILED DESCRIPTION

One or more notification sources, such as beacon devices, such as a BLE beacon may be arranged throughout an environment or venue, such as a retail store, airport, shopping mall, stadium, concert, festival, hospital, and the like. When a user mobile device comes within a certain proximity of the beacon device, the user's mobile device may receive and process a signal from the beacon, which can result in receiving a notification message for the user to view on the user's mobile device. Notification messages, such as push notifications can have a dramatic effect on an application's ability to engage users. As user's interests change over time, social media content can be used to help monitor the evolution of user's interest. Further, by knowing that a user is interested in, the alert preferences for alerting the user to the notification message can be modified accordingly.

Thus, there is a need for an alert system for alerting a user based on a relevancy to a social media activity of the user and a content of a notification. The alert system described herein may analyze push notifications and provide the user with a proper alert according to a relevancy to the user's shared social content.

Figure 1:
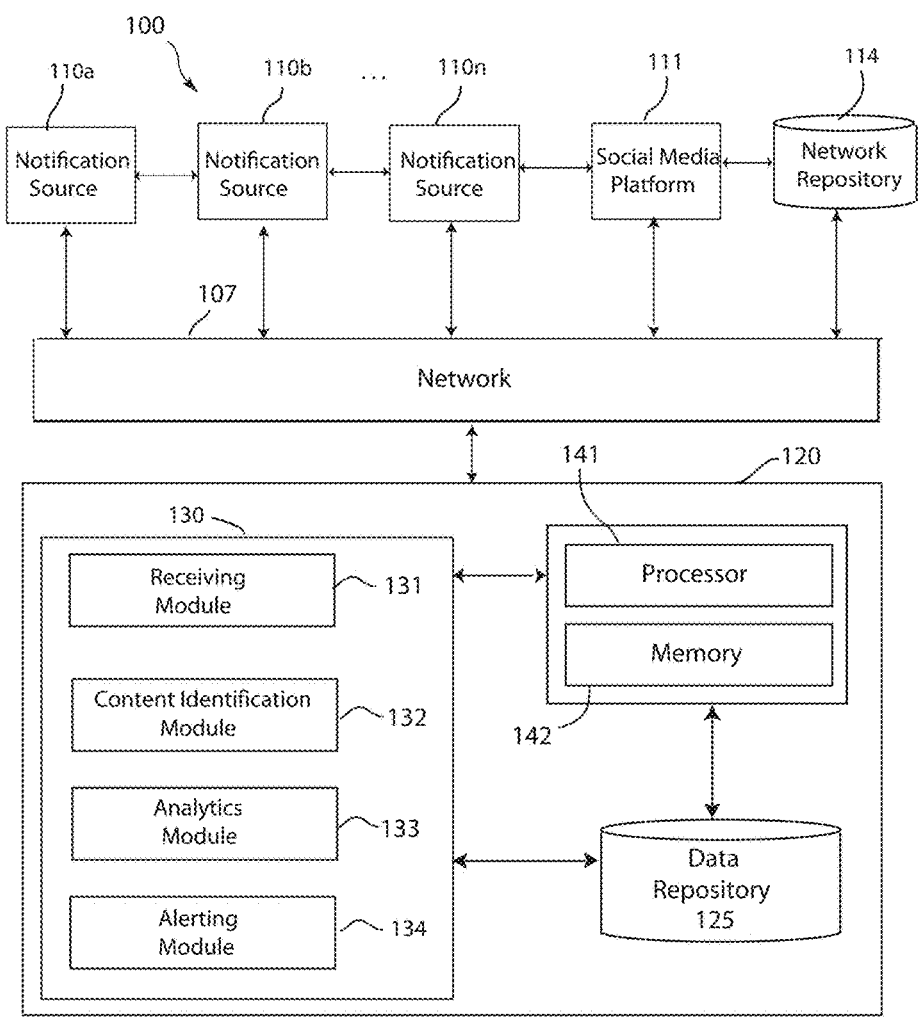
FIG. 1 depicts a block diagram of an alert system, in accordance with embodiments of the present invention.

Referring to the drawings, FIG. 1 depicts a block diagram of alert system 100, in accordance with embodiments of the present invention. Embodiments of the alert system 100 may be a system for determining an alert preference of the user based on relevancy or relationship between a social media activity of the user and a content of a push notification or other notification message. Embodiments of the alert system 100 may be useful for users who prefer to only receive certain push notification that pertain to topics that the user is interested in. For example, users can become annoyed if the user is receiving a notification message that the user is not interested in receiving. Further, the effectiveness of the notifications using alert system 100 is increased because the user is more likely to take advantage of the notification. Notification messages may be signals, communications, transmissions, messages, push notifications, data, notifications, and the like, that contain text, received by a user mobile device from one or more beacon devices or notification sources arranged in an environment of venue. Embodiments of the environment may be a venue, a location, a city, a neighborhood, a district, a shopping center, a warehouse, a building, a school, a campus, a hospital, a base camp, a shopping mall, a retail store, a market, an airport, a train station, a stadium, and the like.

Embodiments of the alert system 100 may be an alert modification system, a notification content and social media content analysis system, an alert customization system, a notification system, and the like. Embodiments of the alert system 100 may include a computing system 120. Embodiments of the computing system 120 may be a computer system, a computer, a cellular phone, a user mobile device, a user computing device, a tablet computer, a smart watch, a wearable computing device, such as smart eyeglasses, a dedicated mobile device, a laptop computer, other internet accessible/connectable device or hardware, and the like. Embodiments of the computing system 120 may include hardware functionality such as a speaker for emitting a sound, a vibration motor for creating vibrations, a display for displaying the notification message, with the ability to flash the display or portions of the content being displayed, a light emitting element for emitting a light, a receiver for receiving communications, a transmitter for transmitting signals, and other similar features and hardware of a smartphone, smartwatch, cell phone, tablet computer, and the like.

Furthermore, embodiments of alert system 100 may include one or more notification sources 110a, 110b . . . 110n, which are devices (for example, beacon devices) that are communicatively coupled to a computing system 120 of the alert system 100 over a computer network 107. For instance, information/data may be transmitted to and/or received from one or more notification sources 110a, 110b . . . 110n over a network 107. A computer network 107 may be the cloud. Further embodiments of computer network 107 may refer to a group of two or more computer systems linked together. Computer network 107 may be any type of computer network known by individuals skilled in the art. Examples of computer network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the computer network 107 may be organized as a client/server architecture.

In some embodiments, the computer network 107 may further comprise, in addition to the computing system 120, a connection to one or more network-accessible knowledge bases 114, which are network repositories containing information of the user, product information, promotional information, social media platform account information, location information, user activity, user preferences, network repositories or other systems connected to the computer network 107 that may be considered nodes of the computer network 107. In some embodiments, where the computing system 120 or network repositories allocate resources to be used by the other nodes of the computer network 107, the computing system 120 and network-accessible knowledge bases 114 may be referred to as servers.

The network-accessible knowledge bases 114 may be a data collection area on the computer network 107 which may back up and save all the data transmitted back and forth between the nodes of the computer network 107. For example, the network repository may be a data center saving and cataloging user activity data, user data, location data, user preference data, and the like, to generate both historical and predictive reports regarding a particular user or a user's message preference, and the like. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 may be a local repository that is connected to the computing system 120.

Embodiments of the one or more notification sources 110a, 110b . . . 110n may be a beacon, a beacon device, RF device, hardware transmitter, a BLE device, a transmitter, an emitting device, and the like, which may broadcast a universally unique identifier for receiving by a user mobile device. The one or more notification sources 110a, 110b . . . 110n may be used for mobile marketing in an environment, broadcasting promotional push notifications to the user mobile devices when the user mobile device is at a particular location or point-of-interest. The one or more notification sources 110a, 110b . . . 110n may be interconnected over a network, or may be independent and separate from the other beacons or notification sources in a same venue or environment. In other embodiments, the notification source 110a, 110b . . . 110c may be one or more server servicing an application downloaded on the user device.

Referring still to FIG. 1, embodiments of the alert system 100 may include a social media platform 111. Embodiments of the social media platform 111 may be communicatively coupled to the computing system 120 over computer network 107. Embodiments of the social media platform 111 of the alert modification system 100 depicted in FIG. 1 may be one or more social media platforms. Moreover, embodiments of social media platform 111 may be one or more websites, applications, databases, storage devices, repositories, servers, computers, engines, and the like, that may service, run, store or otherwise contain information and/or data regarding a social media network of the user and the user's social contacts. The social media platform or platforms 111 may be accessed or may share a communication link over network 107, and may be managed and/or controlled by a third party, such as a social media company. In an exemplary embodiment, the social media platform 111 may be a social media network, social media website, social media engine, and the like, which may store or otherwise contain content supplied by a social contact of the user, as well as content shared by a user on the social media platform 111.

Furthermore, embodiments of the computing system 120 may be equipped with a memory device 142 which may store various data/information/code, and a processor 141 for implementing the tasks associated with the alert modification system 100. In some embodiments, an alert modification application 130 may be loaded in the memory device 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the alert modification application 130. Embodiments of the alert modification application 130 may be an interface, an application, a program, a module, or a combination of modules. In an exemplary embodiment, the alert modification application 130 may be a software application running on one or more back end servers, servicing a user mobile device, or may be a software application running on the user mobile device.

The alert modification application 130 of the computing system 120 may include a receiving module 131, a content identification module 132, an analytics module 133, and an alerting module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the receiving module 131 may include one or more components of hardware and/or software program code for receiving a notification message from a notification source, such as notification sources 110a, 110b, in an environment with one or more notification sources 110a, 110b . . . 110n arranged throughout the environment. For instance, embodiments of the receiving module 131 may receive a transmission from a beacon arranged in an environment when a user reaches a particular physical location within the venue or at a given time from the closest notification source when the notification sources 110a, 110b . . . 110n are broadcasting/transmitting a similar signal. In an exemplary embodiment, the receiving module 131 may receive and/or process the signal received by the receiver hardware of the user mobile device, for further analysis by the alert modification application 130. Furthermore, a notification message can be triggered by events, such as location-based events, context-based events, time-based events, and/or random events.

Referring again to FIG. 1, embodiments of the computing system 120 may further include a content identification module 132. Embodiments of the content identification module 132 may include one or more components of hardware and/or software program for identifying a content of the notification message, in response to receiving the notification message. For instance, embodiments of the content identification module 132 may, in response to receiving the notification message from a beacon or other notification transmitting device, analyze the notification message to determine a content of the notification message. The content of the notification message may be analyzed by a text analysis system that may parse, identify, scan, detect, analyze etc. words using, for example, a natural language processing technique, natural language classification, pre-trained language model, etc. to analyze the content payload of the notification message. The content of the notification message may be items, goods, pictures, locations, services, offers, promotions, sales, invitations, and the like. Embodiments of the content identification module 132 may thus process the notification message so that the computing system 120 understands the content, such as a meaning of the content.

Embodiments of the computing system 120 may include an analytics module 133. Embodiments of the analytics module 133 may include one or more components of hardware and/or software program for analyzing a social media activity of the user to determine that the content of the notification message is relevant to the social media activity of the user on one or more social media platforms 111. For instance, in response to receiving a notification message and determining the content payload of the notification message, the analytics module 133 may analyze, parse, scan, review, etc. a user's shared content and the user's activity on a user's social media account(s), as well as a shared content and an activity of the user on social contacts of the user, shared or otherwise available on one or more social media platforms 111. The analyzing may be performed to determine that a content shared by the user across the social media platform 111 is relevant or otherwise correlates to the content of the notification message. In an exemplary embodiment, the analytics module 133 may analyze a user's social media network activity via content shared by the user on the user's social media page as well as on social contacts' social media page. The analytics module 133 may ascertain a context of the shared content, and then determine whether the context of the shared content correlates or is relevant to the content of the notification message received by the user device of the user. The shared content shared, uploaded, or otherwise posted on the social media platform 111 may be photographs, videos, comments made on other contacts' pages, text-based posts made to the social contact's own social media page, and the like. The shared content may be analyzed, parsed, scanned, searched, inspected, etc. for a context that correlates or otherwise relates to or is associated with the content of the received notification message. In an exemplary embodiment, the analytics module 133 may utilize a natural language technique to determine keywords associated with the content available on the social media platform 111, and then examine the determined keywords with keywords that may be relatable with content encompassed by the notification message. In another exemplary embodiment, the analytics module 133 may utilize an image or visual recognition engine to inspect, parse, scan, analyze, etc. a photograph, image, video, or other content to determine one or more descriptions or insights that describe or are associated with the photograph, image, video, or other content, and then examine the descriptions/insights with keywords that may be relatable with the content encompassed by the notification message. In yet another embodiment, the analytics module 133 may use a combination of natural language techniques, cognitive applications/engines, and visual recognition engines to determine a context, content, and relevancy of the shared content available on the one or more social media platforms for comparison with the content of the notification message.

Moreover, embodiments of the analytics module 133 may compare the determined context and content from the shared content with the content of the notification message received by the receiving module 131. For instance, keywords, texts, insights, or other acquired computer readable information associated with the analyzed shared social media content and user social media activity may be compared with keywords, texts, insights, or other computer readable information associated with the content of the notification message. Based on the comparison, the analytics module 133 may determine that the content of a particular social media content supplied by the user on the user's social media network may be relevant or otherwise correlate to the content of the received notification message.

Figure 2:
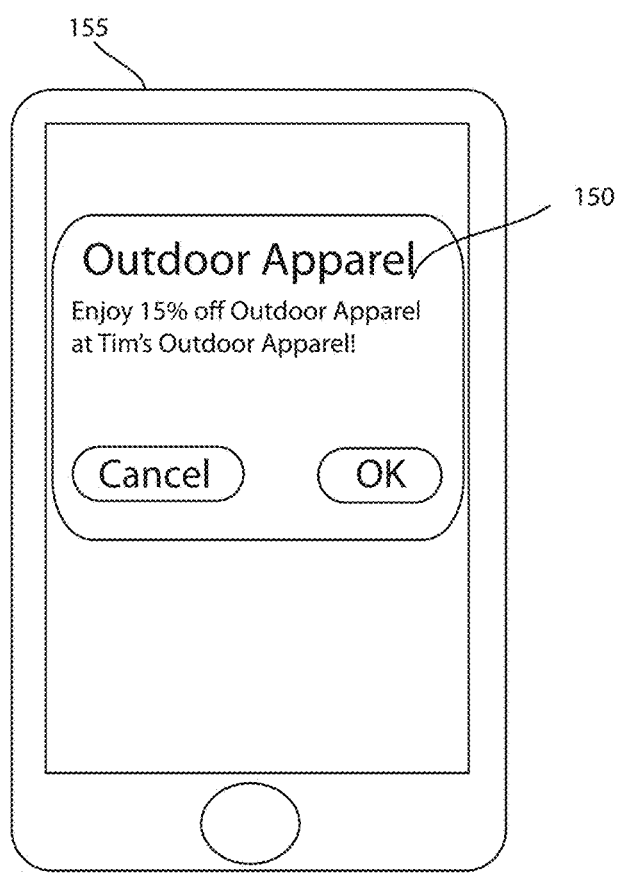
FIG. 2 depicts a first notification message received by a user device, in accordance with embodiments of the present invention.
Figure 3:
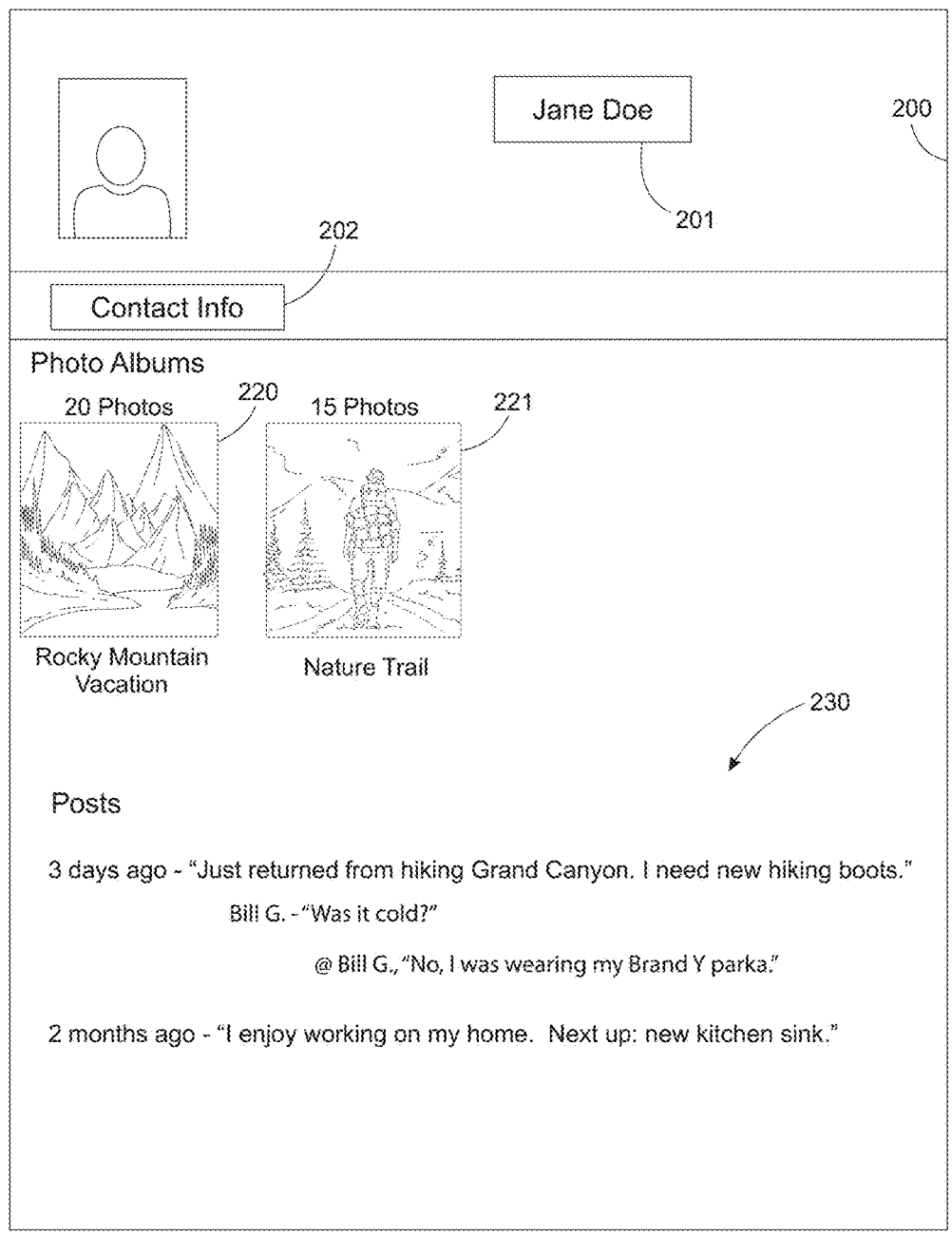
FIG. 3 depicts a social media page of a user, containing shared content, in accordance with embodiments of the present invention.

Turning now to FIGS. 2-3 for an example of analyzing a social media activity of the user (e.g. posts, shared content, frequency of logins, etc.) on one or more social media platforms 111 to determine that the content of the notification message is relevant to the social media activity of the user on one or more social media platforms 111. FIG. 2 depicts a first notification message 150 received by a user device 152, in accordance with embodiments of the present invention. Here, the content of the notification message 150 relates to an offer for outdoor apparel being sold at a nearby store. FIG. 3 depicts a social media page 200 of a user, containing shared content 220, 221, 230, in accordance with embodiments of the present invention. The social media page 200 may include a name or identity 201 of the user and contact information 202. The analytics module 133 may analyze the social media page 200 to determine whether the user's social media page 200 contains any content or activity that may be relevant to outdoor apparel. Here, the shared content on the user's social media page 200 includes two photo albums 220, 221 with multiple photographs. The first photo album 220 has a cover photo of a mountain. The analytics module 133 of the computing system 120 may determine (e.g. based on WATSON visual recognition and insights) that the cover photo is of a mountain, and the photographs of the album are mostly of mountains. The analytics module 133 may then correlate the mountains contained in the photographs (i.e. a context of the shared content) with outdoor apparel (i.e. subject or content of the notification message). Similarly, the second photo album 221 has a cover photo of a person walking on a trail in the outdoors. The analytics module 133 of the computing system 120 may determine (e.g. based on WATSON visual recognition and insights) that the cover photo is of a person walking outside, and the photographs of the album are mostly of the social contact walking outside. The analytics module 133 may then correlate the user or person walking outside in many of the photographs (i.e. a context of the shared content) with hiking and outdoors (i.e. content of the notification message). Furthermore, embodiments of the analytics module 133 may analyze comments 230 posted by user on the user's social media page 200. In the comments, the user has posted text relating to "hiking boots," "Grand Canyon," "parka," "Brand Y," and "hiking," These keywords may be associated with a context of outdoor activities, which can correlate to or is relevant to the purchasing outdoor apparel at a discount, which is the content of the notification message 150.

Figure 4:
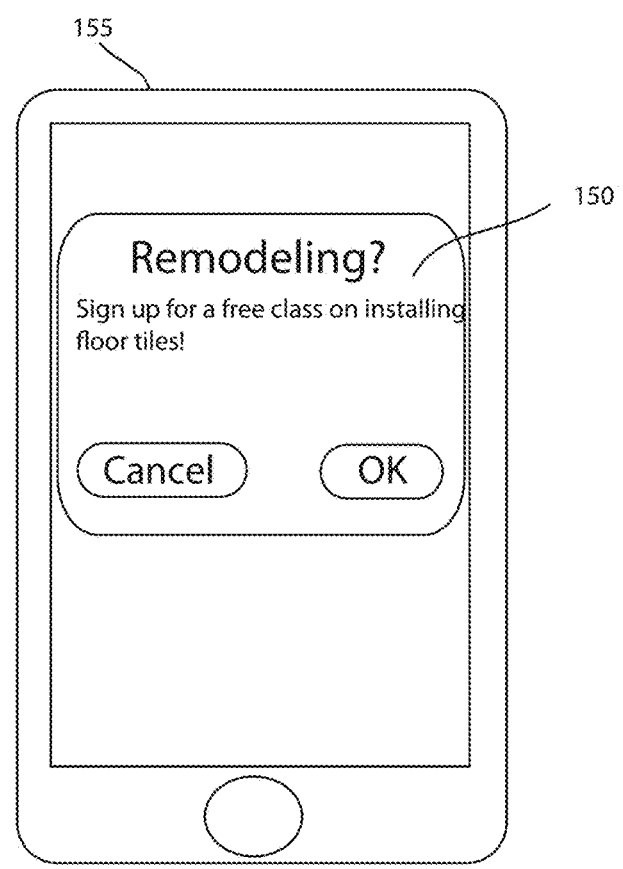
FIG. 4 depicts a second notification message received by a user device, in accordance with embodiments of the present invention.

FIG. 4 depicts a third notification message 150 received by a user device 152, in accordance with embodiments of the present invention. Here, the content of the notification message 150 relates to a home remodeling class to learn how to install floor tiles. The analytics module 133 may analyze the social media page 200 to determine whether the user's social media page 200 contains any content or activity that may be relevant to home remodeling. Here, the shared content on the user's social media page 200 includes comments 230 posted by user on the user's social media page 200 that may be relevant to home remodeling. In the comments 230, the user has posted text relating to "working," "home," "enjoy," and "kitchen sink." These keywords may be associated with a context of home remodeling, which can correlate to or is relevant to signing up for a free class to learn about additional home remodeling projects, which is the content of the notification message 150.

Furthermore, embodiments of the analytics module 133 may also perform a sentiment analysis to the content on the user's social media page 200 to determine a sentiment and/or intention. Sentiment analysis may be performed by the analytics module 133 to help the computing system 120 understand and/or learn a sentiment of the shared content and/or the user. A sentiment may refer to whether the shared content, a feeling of the user, an attitude of the user, a context of the shared content, and/or mental state of the user is positive, negative, or neutral. The sentiment may be derived from natural language processing and sentiment analysis techniques, and may be evaluated or scored on a range or sentiment scale. An intention may refer to an act that a user may take, such as a buying a product, going to a movie, taking a trip, and the like. In the comments 230, the user has used the word "enjoy" when referring to or describing "working," "home," and "kitchen sink." The analytics module 133 may conclude that the user has a positive feeling about working on home projects, and thus may be receptive to a notification message 150 that is relevant to home projects and remodeling. Similarly, in the comments 230, the user has used the word "need" when referring to or describing "new," and "hiking boots." The analytics module 133 may conclude that the user intends to purchase new hiking boots, and thus may be very receptive to a notification message 150 that is relevant to a discount on outdoor apparel.

Figure 5:
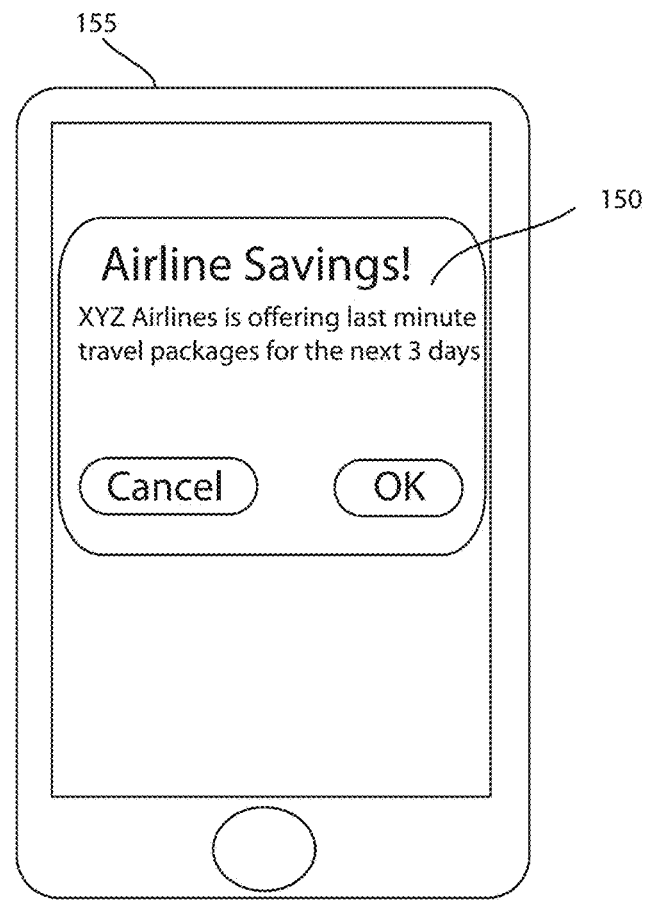
FIG. 5 depicts a third notification message received by a user device, in accordance with embodiments of the present invention.
Figure 6:
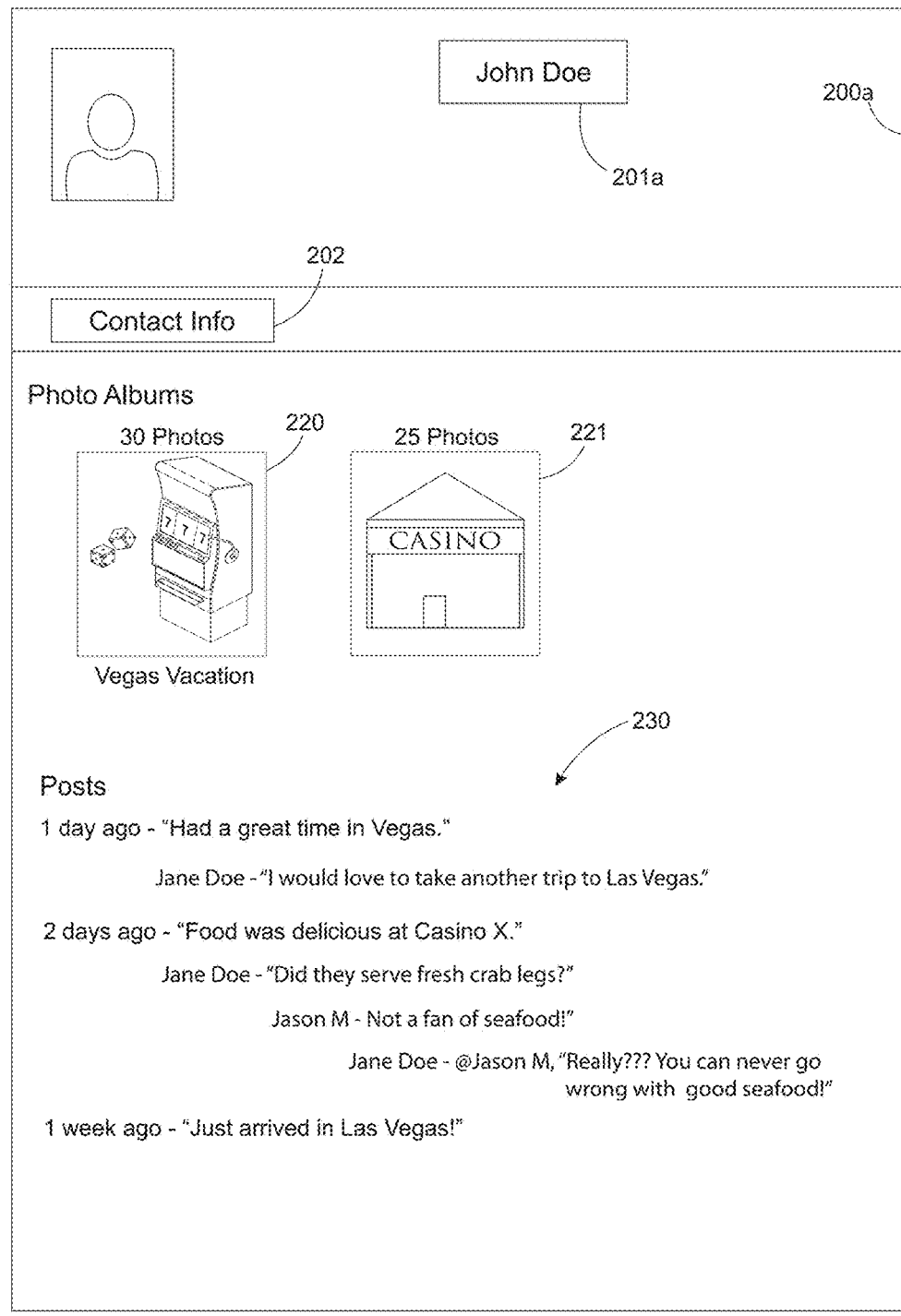
FIG. 6 depicts a social media page of a social media contact of the user, containing shared content, in accordance with embodiments of the present invention.

Turning now to FIGS. 5-6 for another example of analyzing a social media activity of the user (e.g. posts, shared content, frequency of logins, etc.) on one or more social media platforms 111 to determine that the content of the notification message is relevant to the social media activity of the user on one or more social media platforms 111. FIG. 5 depicts a third notification message 150 received by a user device 152, in accordance with embodiments of the present invention. Here, the content of the notification message 150 relates to airline travel and vacation packages. FIG. 6 depicts a social media page 200a of a social media contact 201a of the user, containing shared content 220, 221, 230, in accordance with embodiments of the present invention. The social media page 200a may include a name or identity 201a of the social media contact of the user and contact information 202. The analytics module 133 may analyze the social media page 200a because the user has been active on the social media page 201a. The analytics module 133 may determine whether the user's activity on social media page 200a contains any content or activity that may be relevant to traveling. Here, in the comments 230 on page 200a, the user has posted text relating to "take," "trip," and "Las Vegas." These keywords may be associated with a context of airline travel, which can correlate to or is relevant to the purchasing airline tickets, which is the content of the notification message 150.

Figure 7:
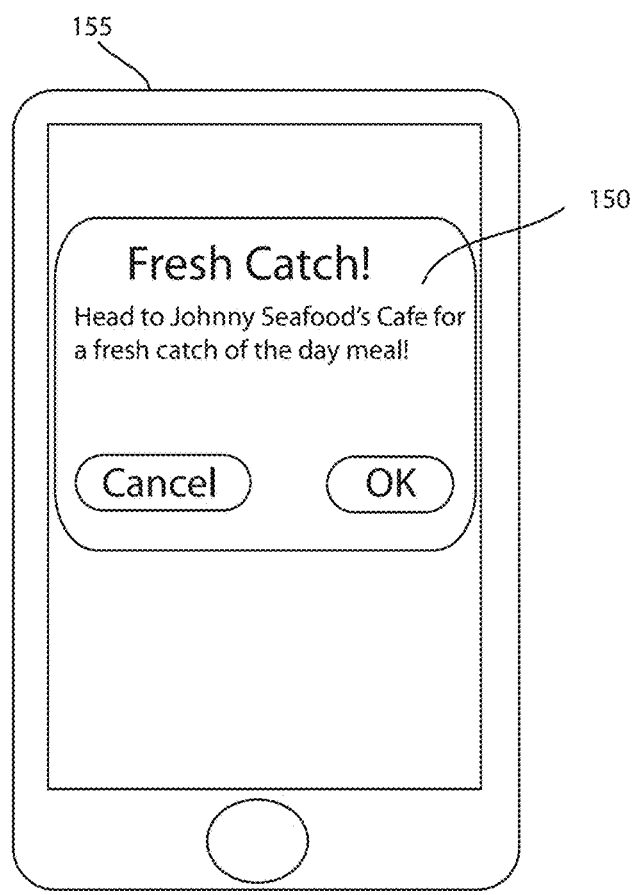
FIG. 7 depicts a fourth notification message received by a user device, in accordance with embodiments of the present invention.

FIG. 7 depicts a fourth notification message 150 received by a user device 152, in accordance with embodiments of the present invention. Here, the content of the notification message 150 relates to a eating seafood at a restaurant. The analytics module 133 may analyze the social media page 200a because the user has been active on the page 200a. The analytics module 132 may determine that the social media page 200a contains content or activity from the user that may be relevant to seafood. Here, the content shared by the user on the user's social media contact's page 200a includes comments 230 posted by user that may be considered relevant to eating seafood. In the comments 230, the user has posted text relating to "crab legs," and "seafood." These keywords may be associated with a context of eating seafood, which can correlate to or is relevant to having a seafood meal, which is the content of the notification message 150 in FIG. 7.

Furthermore, embodiments of the analytics module 133 may also perform a sentiment analysis to the content on social media page 200a to determine a sentiment and/or intention. Sentiment analysis may be performed by the analytics module 133 to help the computing system 120 understand and/or learn a sentiment of the shared content and/or the user. In the comments 230, the user has used the word "never go wrong" and "good" when referring to or describing "seafood." The analytics module 133 may conclude that the user has a positive feeling about eating seafood, and thus may be receptive to a notification message 150 that is relevant to restaurants serving fresh seafood. Similarly, in the comments 230, the user has used the word "love" and "take a trip" when referring to or describing "Las Vegas." The analytics module 133 may conclude that the user intends to take a trip to Las Vegas, and thus may be very receptive to a notification message 150 that is relevant to a discount on airfare, which is the content of the notification message 150 in FIG. 5.

Moreover, embodiments of the analytics module 133 may analyze a recent history of shared social media content and activity of the user for a specified data range measured from receiving the notification message. For instance, the analytics module 133 may analyze the social media activity of the user for a period of time, measured backwards from the time of the receiving the notification message, such as an hour, a day, a week, a couple of weeks, a month, a couple of months, a year, and the like. By analyzing a recent social media activity of the user, the computing system 120 may follow or track changes in the user's interests, needs, etc. over time. Further, social media activity may include recent text posts, recent check-ins, recent photo uploads, recent "liked" items, and recent re-shares.

Referring back to FIG. 1, embodiments of the computing system 120 may also include an alerting module 134. Embodiments of the alerting module 134 may include one or more components of hardware and/or software program code for alerting the user of the notification message in accordance with a modified alert preference. For instance, embodiments of the alerting module 134 may notify or otherwise alert the user to the notification using a specific, custom alert based on a determined relevance to social media activity of the user. By alerting the user with a specific alert preference, the user may then know that the notification is likely to be important or otherwise worth checking. The modified alert preferences may include variations of sensory, audible, haptic, etc. feedback, to assist the user in deciding whether it is worth the user's time to check the notification and carefully examine the notification, especially in situations where the user is inundated with notifications from various sources. In an exemplary embodiment, the alerting module 134 may display the notification on a screen of the user's mobile device, along with a perceptible sensory action, including a tone, a sound, a vibration, an emission of light, a sporadic emission of light, etc. The alerting module 134 may instruct various hardware functionalities to perform various tasks to implement the modified alert preference associated with notification. For example, the alerting module 134 may instruct the mobile device hardware, such as a light element, a display, a vibration motor, a speaker, associated software, and the like.

Furthermore, the modified alert preference modified based on the relevancy to social media activity of the user may be distinguishable from a default alert preference that is used for notification messages that are determined to not be relevant to the social media activity. In other words, the modified alert preference may be more prominent than a default alert. Embodiments of the alerting module 134 may determine that a default alert preference should be modified based on the determination that the notification message is relevant to recent social media activity/shared content of the user.

Embodiments of an alert or alert preference may include a short vibration, a long vibration, a short vibration and a ringtone, a long vibration and a ringtone, a silent notification, a flashing notification (e.g. notification banner flashing), a silent notification and a flashing notification, a tone, a color (e.g. color of banner background of notification message of a particular color), and a combination thereof. Further, alert preferences may involve a change in volume (e.g. tone gradually increases, or starts at a higher volume level than a setting on the phone), a change in font size, a change in font style, such as bold, italics, and underlined font, a change in vibration strength and/or duration, a strobe effect using a light element on the user mobile device, a change in vibration frequency, and the like.

Figure 8:
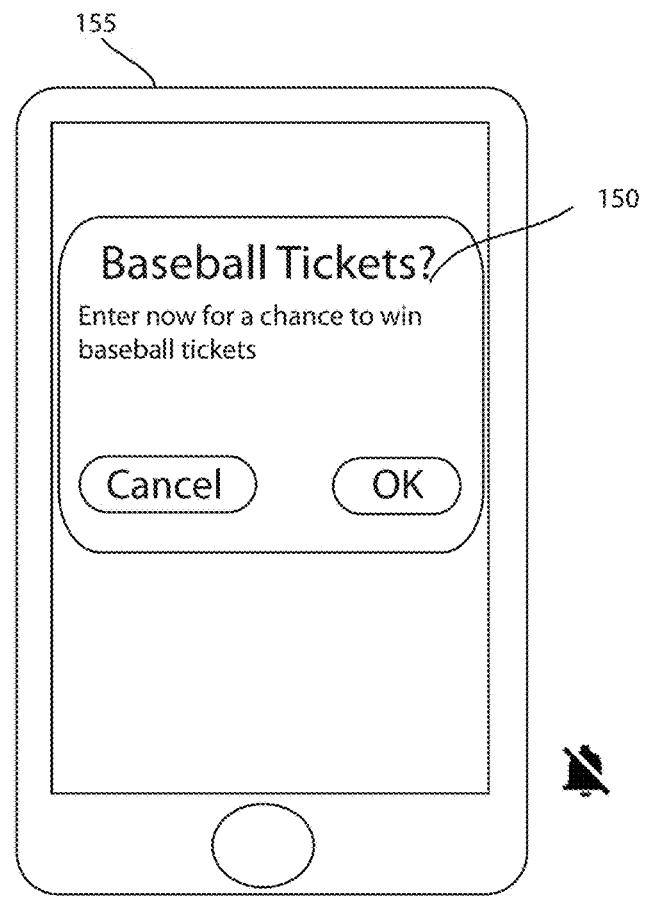
FIG. 8 depicts a fifth type of notification message along with a pictorial representation of a corresponding alert preference, in accordance with embodiments of the present invention.

In an exemplary embodiment, the default alert preference may be selected by the user or may be automatically set by the computing system 120 to correspond to a situation where the content of the notification message is not relevant to the social media activity of the user. For example, the user may interact with the user mobile device GUI of alert modification application 130 to enter which alerts the user would prefer to receive for a particular type of notification message received. FIG. 8 depicts a fifth type of notification message 150 along with a pictorial representation of a corresponding alert preference, in accordance with embodiments of the present invention. Here, the notification message 150 elicits no notification to the user (depicted as an alarm bell having a ling through the alarm bell). The analytics module 133 has analyzed the social media activity of the user, as depicted in FIGS. 3 and 6, and determined that the content of the notification message 150 (i.e. baseball tickets) is not relevant to the social media activity of the user on one or more social media platforms 111. The alerting module 134 may use a silent notification, or no notification beyond appearing as a banner on a screen of the user's mobile device, because of a lack of relevancy to the social media activity of the user.

Figure 9:
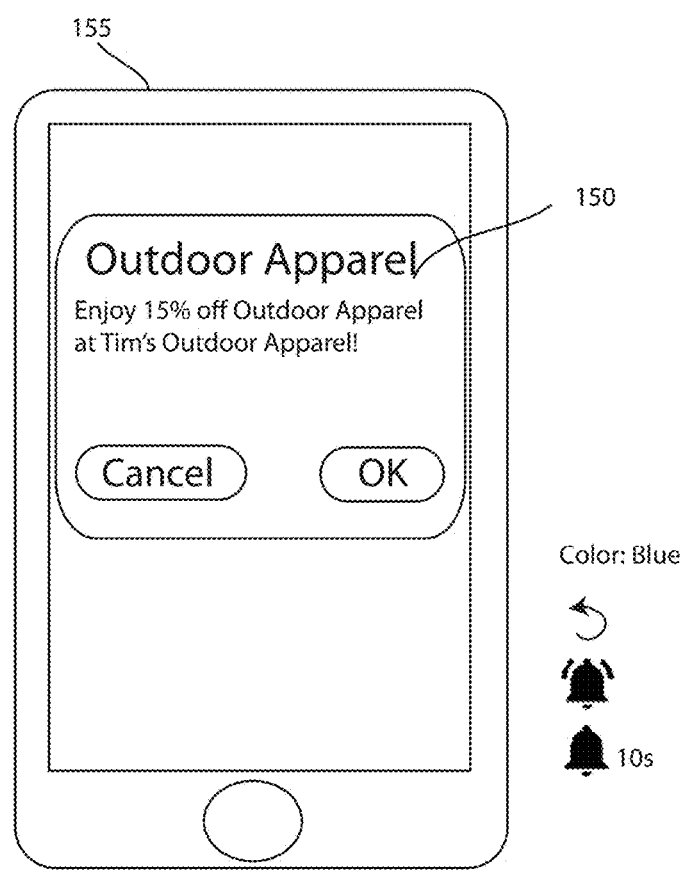
FIG. 9 depicts the first notification message of FIG. 2, along with a pictorial representation of a corresponding alert preference, in accordance with embodiments of the present invention.

FIG. 9 depicts the first notification message of FIG. 2, along with a pictorial representation of a corresponding alert preference, in accordance with embodiments of the present invention. Here, the content of the notification message 150 has been determined to be relevant, so the alerting module 134 modifies the default alert preference, such as the alert depicted in FIG. 8 to a modified alert preference. In this example, the modified alert preference elicits an audible tone for ten seconds in combination with a short vibration, and a specific color coded banner (depicted as a single alarm bell and 10 s, along with a single alarm bell having vibration effect, and "blue"). Embodiments of the alerting module 134 may modify the default or low impact alert in many ways, so long as the user may perceive a difference between the alerts. Embodiments of modified alert or modified alert preference may have a varying time duration for making audible sound, and may be a short vibration, a long vibration, a short vibration and a ringtone, a long vibration and a ringtone, a silent notification, a flashing notification, a silent notification and a flashing notification, a tone, a color, and a combination thereof. Further, the alerting module 134 may modify the alert by changing the volume, increasing the volume, changing a font size, changing a font style, such as bold, italics, and underlined font, changing an amplitude or frequency of the vibration, changing a force of the vibration, increasing a length of the vibration, repeat various modifications, and the like.

Figure 10:
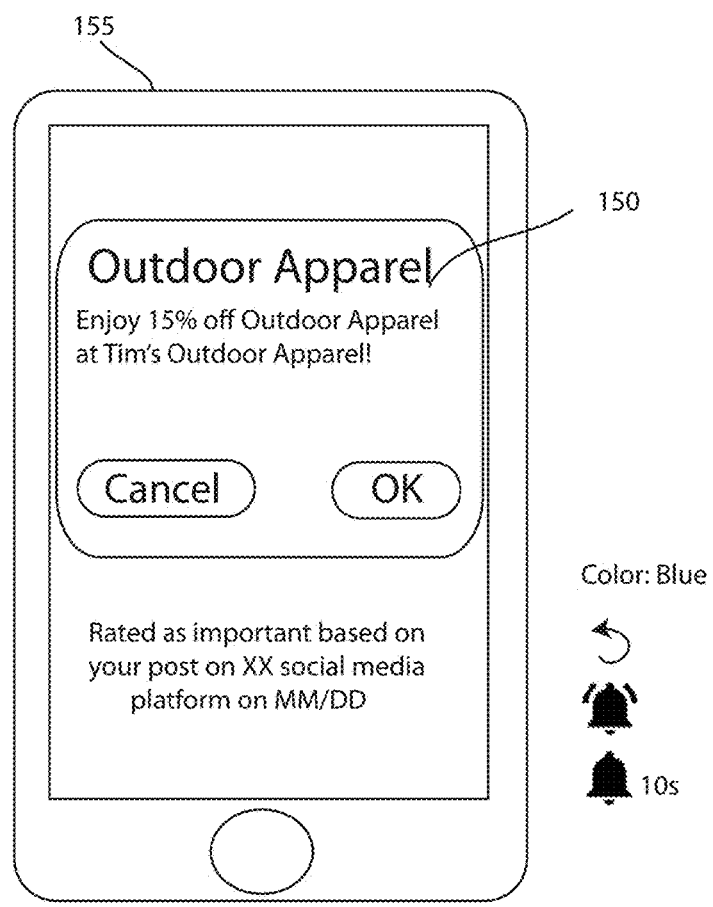
FIG. 10 depicts the notification of FIG. 9, along with an explanation as to why the alert was modified, in accordance with embodiments of the present invention.

FIG. 10 depicts the notification of FIG. 9, along with an explanation as to why the alert was modified, in accordance with embodiments of the present invention. Along with the modification to the alert method (e.g. how the notification is presented to the user), embodiments of the alerting module 134 may attach additional metadata as to why the alert was modified. For example, the notification message 150 of FIG. 10 depicts a reason why the notification alert was modified and/or made more prominent, that is, the content of the notification was relevant to a recent social media post regarding hiking boots and outdoor activities.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the alert system 100 offers a method to filter push notifications received from notification sources based on a social media activity. The alert modification system 100 may be individualized to each user/user device, which is being used to filter notifications based on a social media activity, by analyzing the content of the push notification and using device hardware to notify the user.

Furthermore, the alert modification system 100 improves computer technology by saving computing power resources. Issuing an alert to the user uses power and other computing resources of a mobile device. Additional power is also used if the user activates the device from a rest state with the screen turned off to an active state to check the alert. The claimed solution is necessarily rooted in computer technology in order to overcome a problem specifically arising in the realm of computer technology. By reducing the number of alerts presented to the user using a specific set of rules, there is a savings in the computing resources used. For example, in the embodiment shown in FIG. 8, the alert modification application 130 does not use computing power to sound an alarm, cause the mobile to vibrate, etc., which may normally occur without the alert modification application 130 because the alert modification system 100 has determined that a particular user is not likely to be interested. In other words, the alert modification application 130 may determine that a notification message 150 received by the user should be presented to the user in accordance with an alert preference that may consume less computing resources than if the notification message 150 was presented to the user in a traditional manner (i.e. without analyzing the content payload of the notification message 150 and the social media activity of the user across one or more social media platform 111). Thus, in some embodiments, there is an improvement to the computing device/systems overall, because the alert system 100 may be directed to an improvement to computer technology, including software that improves the capability of a computing device.

Figure 11:
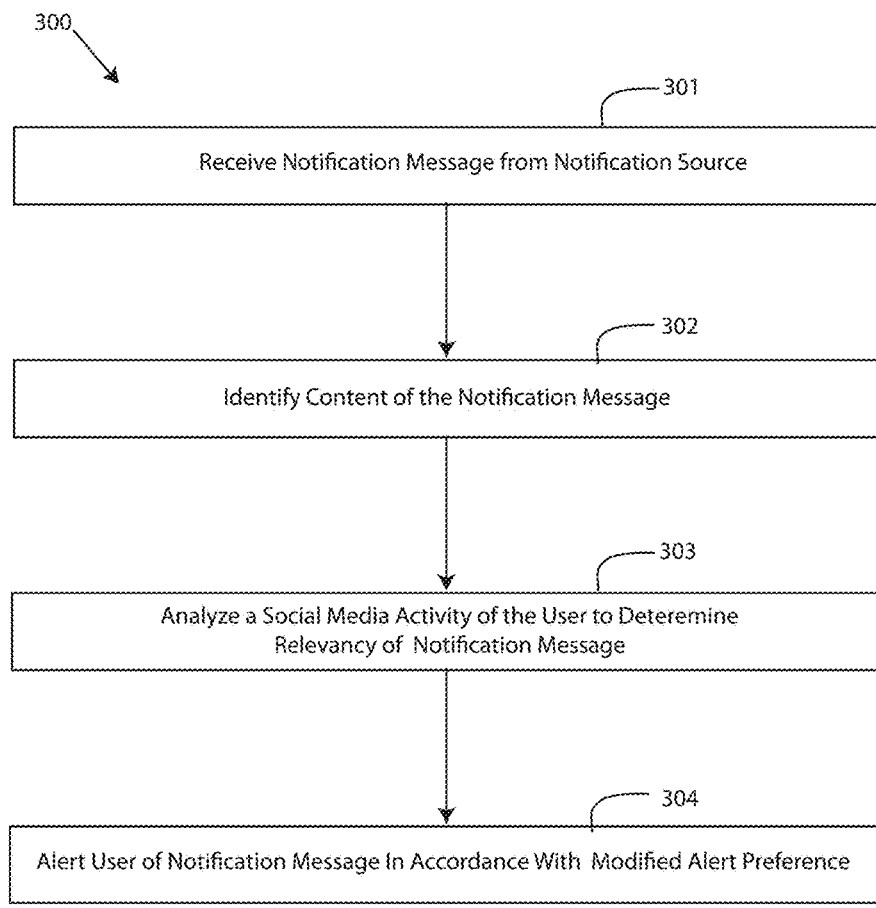
FIG. 11 depicts a flow chart of a method for alert modification based on a social media activity of a user, in accordance with embodiments of the present invention.

Referring now to FIG. 11, which depicts a flow chart of a method 300 for alert modification based on a social media activity of a user, in accordance with embodiments of the present invention. One embodiment of a method 300 or algorithm that may be implemented for alert modification based on a social media activity of a user with the alert modification system 100 described in FIGS. 1-10 using one or more computer systems as defined generically in FIG. 13 below, and more specifically by the specific embodiments of FIG. 1.

Embodiments of the method 300 for alert modification based on a social media activity of a user, in accordance with embodiments of the present invention, may begin at step 301 wherein a notification is received by the user mobile device from one or more notification sources 110a, 110b . . . 110n. Step 302 identifies a content of the notification message. Step 303 analyzes a social media activity of the user to determine a relevancy of notification message, based on the content/activity of the user on one or more social media platforms 111. Step 304 modifies an alert preference when alerting the user to denote a significance of the incoming notification message.

Figure 12:
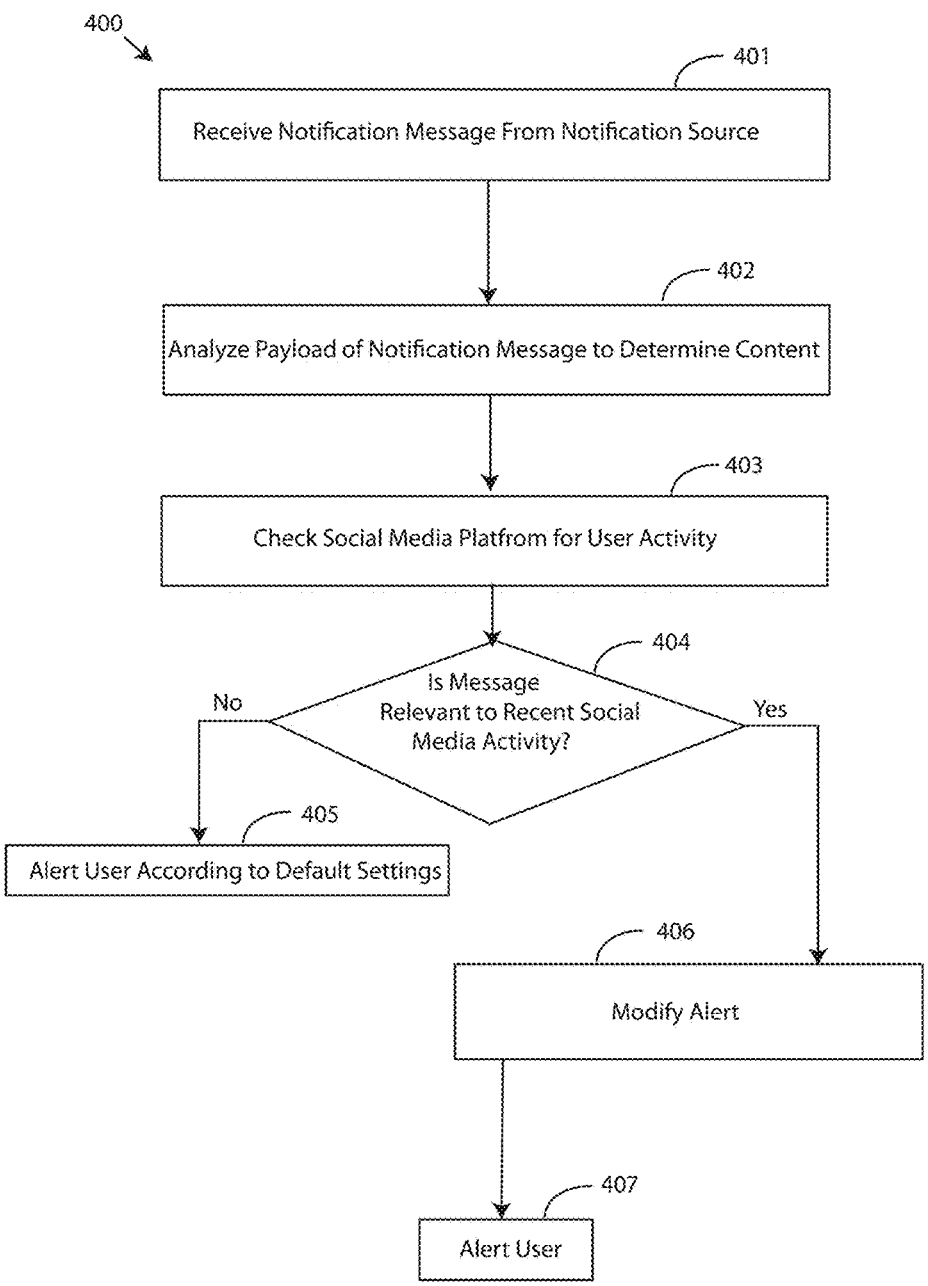
FIG. 12 depicts a detailed flow chart of a method for alert modification based on a social media activity of a user, in accordance with embodiments of the present invention.

FIG. 12 depicts a detailed flow chart of a method 400 for alert modification based on a social media activity of a user, in accordance with embodiments of the present invention. Embodiments of the method 400 for alert modification based on a social media activity of a user may begin at step 401, wherein the notification message is received a notification source 110a, 110b . . . 110n. Step 402 analyzes the body or content payload of the notification message to determine a content of the notification message. Step 403 checks a social media platform 111 for user activity, for example a recent activity. Step 404 determines whether the notification message is relevant to the social media activity. If no, step 405 alerts user according to default settings, with no customized alert preference or prominent alert method. If yes, step 406 modifies the alert preference from the default alert preference to a modified alert preference. Step 407 alerts the user accordingly.

Figure 13:
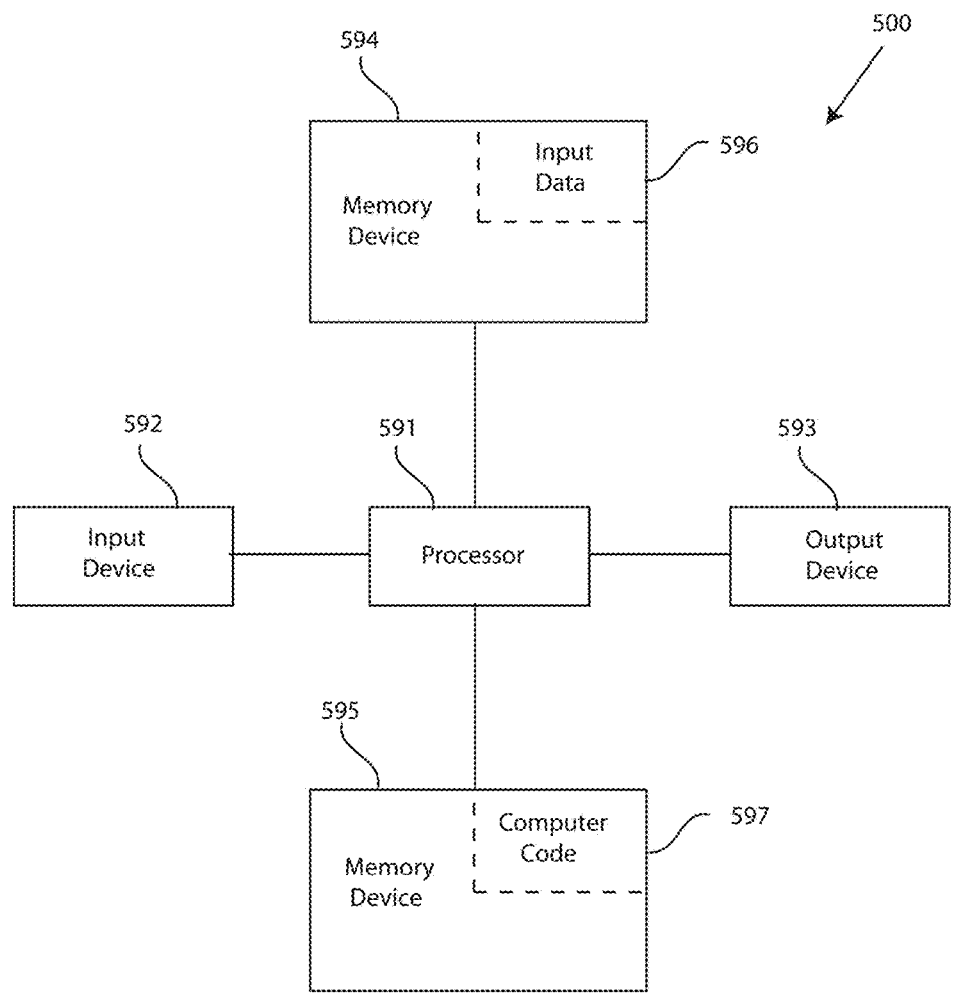
FIG. 13 depicts a block diagram of a computer system for the alert modification system of FIGS. 1-10, capable of implementing methods for alert modification based on a social media activity of a user of FIGS. 11-12, in accordance with embodiments of the present invention.

FIG. 13 depicts a block diagram of a computer system for the alert modification system 100 of FIGS. 1-10, capable of implementing methods for alert modification based on a social media activity of a user of FIGS. 11-12, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for alert modification based on a social media activity of a user in the manner prescribed by the embodiments of FIGS. 11-12 using the alert modification system 100 of FIGS. 1-10, wherein the instructions of the computer code 597 may be executed by processor 591 via memory device 595. The computer code 597 may include software or program instructions that may implement one or more algorithms for implementing the method for alert modification based on a social media activity of a user, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 13.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to alert modification systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to modify alerts based on a type of notification. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for alert modification based on a social media activity of a user. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for alert modification based on a social media activity of a user.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
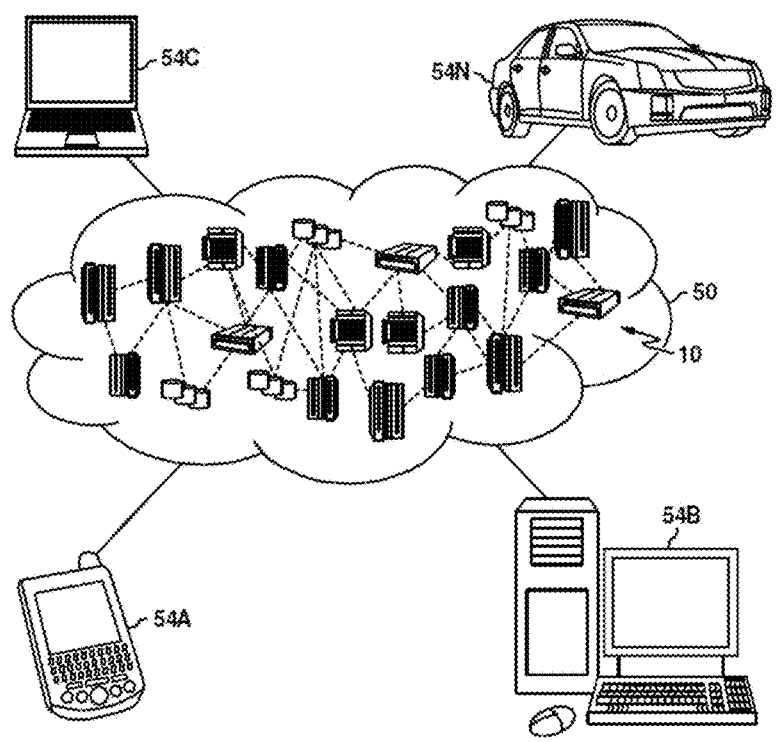
FIG. 14 depicts a cloud computing environment, in accordance with embodiments of the present invention.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 14 are intended to be illustrative only and that computing nodes 10 and cloud computing environment 50 can communicate with any type of computerized device over any type of network and/or network addressable connection (e.g., using a web browser).

Figure 15:
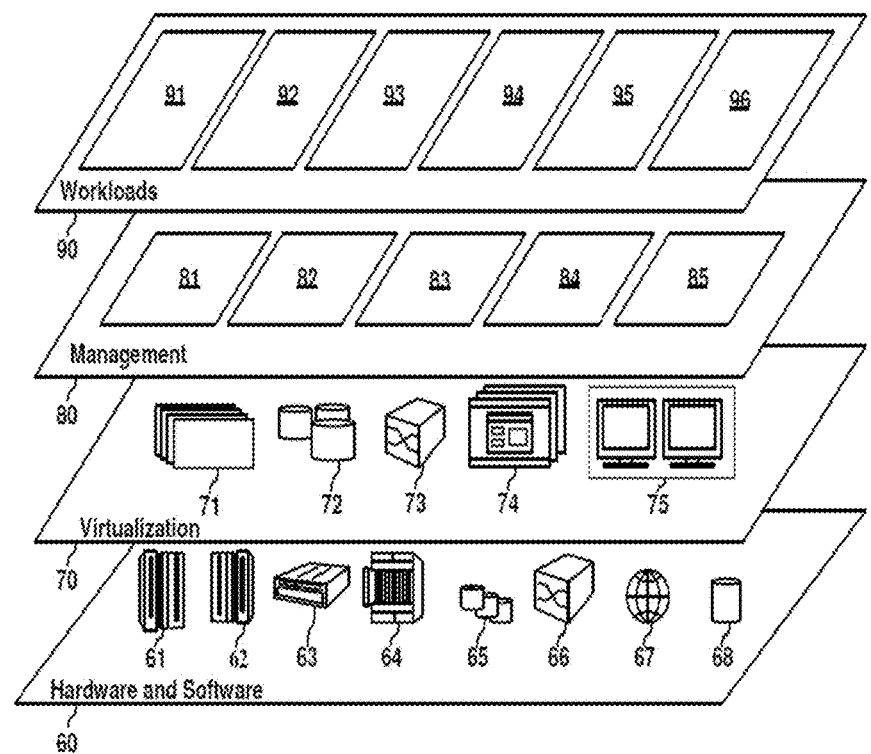
FIG. 15 depicts abstraction model layers, in accordance with embodiments of the present invention.

Referring now to FIG. 15, a set of functional abstraction layers provided by cloud computing environment 50 (see FIG. 14) are shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and alert modification 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for alert modification based on a social media activity of a user, the method comprising:
   receiving, by a processor of a computing system, an incoming notification message from a notification source positioned within a venue;
   identifying, by the processor, a content of the incoming notification message, in response to receiving the incoming notification message;
   analyzing, by the processor, the social media activity of the user to determine that the content of the incoming notification message is relevant to the social media activity of the user;
   modifying, by the processor, a default alert preference based on a relevancy between the incoming notification message and the social media activity of the user so that the user is alerted to the incoming notification message in accordance with a modified alert preference;
   alerting, by the processor, the user of the incoming notification message in accordance with the modified alert preference; and
   wherein analyzing the social media activity includes analyzing a history of shared social media content of the user for a specified data range measured from receiving the notification message.

2. The method of claim 1, wherein the modified alert preference is distinguishable from a default alert preference that is used for notification messages that are determined to not be relevant to the social media activity.

3. The method of claim 1, wherein the modified alert preference has a varying time duration, and is selected from the group consisting of: a short vibration, a long vibration, the short vibration and a ringtone, the long vibration and the ringtone, a silent notification, a flashing notification, the silent notification and the flashing notification, a tone, a color, and a combination thereof.

4. The method of claim 1, wherein the modified alert preference includes a change in volume, a change in font size, a change in font style, such as bold, italics, and underlined font, a change in vibration.

5. The method of claim 1, wherein the analyzing further includes determining a sentiment and an intention of the social media activity of the user.

6. The method of claim 1, further comprising: repeating, by the processor, the alerting of the notification message when an alert preference is modified.

7. A computer system, comprising:
   a processor;
   a memory device coupled to the processor; and
   a computer readable storage device coupled to the processor, wherein the storage device contains program code executable by the processor via the memory device to implement a method for alert modification based on a social media activity of a user, the method comprising:
   receiving, by a processor of a computing system, an incoming notification message from a notification source positioned within a venue;
   identifying, by the processor, a content of the incoming notification message, in response to receiving the incoming notification message;
   analyzing, by the processor, the social media activity of the user to determine that the content of the incoming notification message is relevant to the social media activity of the user;
   modifying, by the processor, a default alert preference based on a relevancy between the incoming notification message and the social media activity of the user so that the user is alerted to the incoming notification message in accordance with a modified alert preference;
   alerting, by the processor, the user of the incoming notification message in accordance with the modified alert preference; and
   wherein analyzing the social media activity includes analyzing a history of shared social media content of the user for a specified data range measured from receiving the notification message.

8. The computer system of claim 7, wherein the modified alert, preference is distinguishable from a default alert preference that is used for notification messages that are determined to not be relevant to the social media activity.

9. The computer system of claim 7, wherein the modified alert preference has a varying time duration, and is selected from the group consisting of: a short vibration, a long vibration, the short vibration and a ringtone, the long vibration and the ringtone, a silent notification, a flashing notification, the silent notification and the flashing notification, a tone, a color, and a combination thereof.

10. The computer system of claim 7, wherein the modified alert preference includes a change in volume, a change in font size, a change in font style, such as bold, italics, and underlined font, a change in vibration.

11. The computer system of claim 7, wherein the analyzing further includes determining a sentiment and an intention of the social media activity of the user.

12. The computer system of claim 7, further comprising: repeating, by the processor, the alerting of the notification message when an alert preference is modified.

13. A computer program product, comprising a computer readable hardware storage device storing a computer readable program code, the computer readable program code comprising an algorithm that when executed by a computer processor of a computing system implements a method for alert modification based on a social media activity of a user, the method comprising:
   receiving, by a processor of a computing system, an incoming notification message from a notification source positioned within a venue;
   identifying, by the processor, a content of the incoming notification message, in response to receiving the incoming notification message;
   analyzing, by the processor, the social media activity of the user to determine that the content of the incoming notification message is relevant to the social media activity of the user;
   modifying, by the processor, a default alert preference based on a relevancy between the incoming notification message and the social media activity of the user so that the user is alerted to the incoming notification message in accordance with a modified alert preference;
   alerting, by the processor, the user of the incoming notification message in accordance with the modified alert preference; and
   wherein analyzing the social media activity includes analyzing a history of shared social media content of the user for a specified data range measured from receiving the notification message.

14. The computer program product of claim 13, wherein the modified alert-preference is distinguishable from a default alert preference that is used for notification messages that are determined to not be relevant to the social media activity.

15. The computer program product of claim 13, wherein the modified alert preference has a varying time duration, and is selected from the group consisting of: a short vibration, a long vibration, the short vibration and a ringtone, the long vibration and the ringtone, a silent notification, a flashing notification, the silent notification and the flashing notification, a tone, a color, and a combination thereof.

16. The computer program product of claim 13, wherein the modified alert preference includes a change in volume, a change in font size, a change in font style, such as bold, italics, and underlined font, a change in vibration.

17. The computer program product of claim 13, wherein the analyzing further includes determining a sentiment and an intention of the social media activity of the user.

* * * * *